United States Patent [19]

Härkönen

[11] Patent Number: 4,484,478

[45] Date of Patent: Nov. 27, 1984

[54] PROCEDURE AND MEANS FOR MEASURING THE FLOW VELOCITY OF A SUSPENSION FLOW, UTILIZING ULTRASONICS

[76] Inventor: Eino Härkönen, Halliruskatu 9 as 13, 90100 Oulu 10, Finland

[21] Appl. No.: 432,367

[22] Filed: Sep. 30, 1982

[30] Foreign Application Priority Data

Oct. 19, 1981 [FI] Finland .................................. 813259

[51] Int. Cl.$^3$ .............................................. G01F 1/74
[52] U.S. Cl. .............................. 73/861.06; 73/861.25
[58] Field of Search ........... 73/861.06, 861.25, 861.04; 324/160, 175; 356/28; 364/510

[56] References Cited

U.S. PATENT DOCUMENTS

| | | | |
|---|---|---|---|
| 3,554,030 | 1/1971 | Peronneau | 73/861.25 |
| 3,762,221 | 10/1973 | Coulthard | 73/861.06 |
| 4,162,509 | 7/1979 | Robertson | 356/28 |
| 4,201,083 | 5/1980 | Kurita et al. | 73/861.06 |
| 4,255,977 | 3/1981 | Newhouse et al. | 73/861.25 |
| 4,257,275 | 3/1981 | Kurita et al. | 73/861.06 |
| 4,312,592 | 1/1982 | Sabater et al. | 356/28 |

FOREIGN PATENT DOCUMENTS 1232113 10/1960 France .............................. 73/861.25

OTHER PUBLICATIONS

Walker "Guidelines for Applying Doppler Acoustic Flowmeters" in Intech, 10/80, pp. 55–57.
Greene et al., "Noninvasive Pulsed Doppler Blood Velocity Measurements and Calculated Glow in Human Arteries" in ISA Transaction, vol. 20, No. 2, 1981, pp. 15–24.

Primary Examiner—Herbert Goldstein
Attorney, Agent, or Firm—Steinberg & Raskin

[57] ABSTRACT

In a method of measuring the flow velocity of a suspension by ultrasonic echo pulse technique, two or several ultrasonic transducers, located at a distance from each other, are placed on the surface of the pipe conducting a suspension flow. An ultrasonic pulse is transmitted from the transducers through the pipe and an echo of the ultrasonic pulse is received after a time determined by the depth of the suspension. The echo pulses are received, and a low frequency signal contained in such pulses, caused by fibres or other particles in the suspension, is amplitude-detected. A second, or later, echo from the opposite wall of the pipe is utilized if a received echo is masked by the transmitted pulse. The signals derived from the transducers are compared by correlation and the flow velocity of the suspension to be measured is thus determined. The second echo from the opposite wall of the measuring pipe is preferably used. The ultrasonic pulse is delivered from the transducer perpendicularly against the opposite wall of the pipe and is reflected back to the transducer side of the pipe when it is reflected again back to the opposite side and once again reflected to the transducer.

16 Claims, 3 Drawing Figures

PROCEDURE AND MEANS FOR MEASURING THE FLOW VELOCITY OF A SUSPENSION FLOW, UTILIZING ULTRASONICS

BACKGROUND OF THE INVENTION

The present invention relates to a procedure for measuring the flow velocity of a suspension flow. More particularly, the invention relates to a method of measuring the flow velocity of a suspension flow by utilizing ultrasonics.

Ultrasonic transducers are mounted on the surface of the pipe or equivalent through which the suspension flows. The transducers are spaced a predetermined distance from each other in the direction of flow and transmit an ultrasonic pulse through the pipe or equivalent into the suspension flow. The ultrasonic pulse passing through the suspension is received after a time determined by the measuring depth. The low frequency signal contained in the received pulses, caused by fibres or other particles in the suspension, is amplitude-detected and the signals derived from the transducers are compared by correlation to determine the flow velocity of the suspension.

The invention also relates to apparatus for measuring the flow velocity of a suspension, in particular, a paper pulp suspension, by ultrasonic echo pulses.

Precision flow velocity meters known in the art may be divided into measuring instruments of four different types. These are the magnetic meter, the ultrasonic meter, the vortex meter and the horizontal turbine meter.

The magnetic meter is insensitive to the velocity profile and, in addition, the pressure drop is nearly nil. The magnetic meter has an accuracy of ±0.5% and 0.5% of full scale deflection. Furthermore, the magnetic meter is awkward to install and is expensive.

The ultrasonic meter is sensitive to the velocity profile, but the pressure drop caused by said meter is nearly nil. The accuracy of the ultrasonic meter is ±0.1%. The ultrasonic meter has to be recalibrated when a suspension to be measured flows through different pipes.

The vortex meter is not operative at all with low flow velocities and causes a considerable pressure drop. The accuracy of the vortex meter is ±0.5%. Furthermore, the vortex meter is awkward to install.

The horizontal turbine meter causes a considerable pressure drop and its range of operation is comparatively narrow. The accuracy of the horizontal turbine meter is ±0.25%. In addition, the horizontal turbine meter is awkward to install.

The state of art constituting the starting point of the invention consists of the following references. "Automaatiopäivät (Automation Days)", 1981, III, p. 425, "Ultraäänen ja ristikorrelaatiotekniikan kUML /a/ ytUML /oo/ n perustuva virtausmittari (A Flow Meter Based on the Use of Ultrasonics and of Cross-Correlation Technique)", U.S. Pat. No. 3,762,221, and German application print No. 2,321,832.

SUMMARY OF THE INVENTION

The principal object of the invention is to provide a flow velocity measuring method and apparatus for a suspension flow, which method and apparatus are improvements over methods and apparatus known in the art.

An object of the invention is to provide a flow velocity measuring method and apparatus which are free from the disadvantages and drawbacks of procedures and apparatus known in the art.

Another object of the invention is to provide a flow velocity measuring method and apparatus which do not interfere with the flow.

Still another object of the invention is to provide a flow velocity measuring method and apparatus which are capable of making measurements in turbulent flow, without observable pressure drop.

Yet another object of the invention is to provide flow velocity apparatus which is installed with facility and ease.

In one embodiment of the method of the invention, ultrasonic echo pulses are utilized in a manner whereby the same transducers function as both transmitters and receivers. A first, or later, echo from the opposite wall of the measuring pipe or equivalent is utilized in the method of the invention.

In another embodiment of the method of the invention, an ultrasonic echo pulse method is applied in a manner whereby the same transducers function as both transmitters and receivers. When the diameter of the measuring pipe or equivalent is great, a measuring depth is utilized, which depth is such that the echo of an ultrasonic pulse received after a time determined by said depth is such that said echo consists of the first echos scattered by the fibres or other equivalent particles in the suspension.

The apparatus of the invention comprises at least two ultrasonic transducers mounted on the surface of the pipe or equivalent conducting the suspension flow. The transducers are spaced a known distance from each other. An echo pulse transmitter/receiver comprises an ultrasonic pulse transmitter, a transmitter/receiver transducer, a detector, a sampling and holding circuit and a control and timing circuit, all of which are electrically connected to operate in a manner according to the method of the invention.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

The correlation process is described, to begin with, to provide the background of the invention. The correlation process is accomplished, for example, by multiplying two signals, ordinate by ordinate, and by summing the result over the entire abscissa duration. The cross-correlation function is defined as follows:

$$R_{xy}(L,\tau) = \lim \frac{1}{T} \int_0^T y(t)\,x(t-\tau)\,dt, \qquad (1)$$

wherein $T \to \infty$ $R_{xy}(L,\tau)$ is a function of the delay $\tau$, and has its maximum at the value $\tau = \tau_m$ of the delay, where the signals derived from the two different points resemble each other most closely.

The flow velocity $V_k$ at constant flow is thus simply obtained $$V_k = k \frac{L}{\tau_m}, \quad (2)$$

wherein
L = distance of the point of measurement,
$\tau_m$ = the maximum delay, where the correlation is highest,
k = a calibration constant, its magnitude depending on the viscosity of the pulp stock, and partly on the flow velocity.

In Equation (1), the waveform x(t) is multiplied by the delayed $x(t-\tau)$ and the product is averaged over the period T. This may also be written $$R_{xy}(T) = y(1)x(t-\tau).$$

The continuous averaging may be performed by analog procedure, but it is more advantageous in digital systems to approximate this mean by taking samples from the signal at intervals of $\Delta t$ seconds and by summing a finite number N of such products of samples. This may be calculated for a plurality of values of $\tau$. The range in which the delay must vary depends upon the bandwidth of the signal. In flow measurements, the calculation delay of the correlation may be approximately estimated and the delay range of a commercial correlator may be adjusted to be proper for the measurement.

Figure 1:
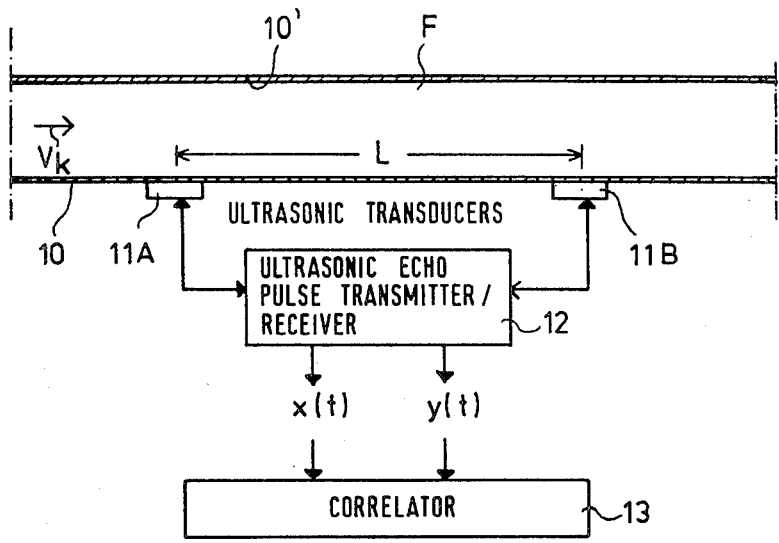
FIG. 1 is a block diagram, partly in section, illustrating the principle of the procedure of the invention for measuring the flow velocity of a suspension fluid.

FIG. 1 illustrates the principle of the method of the invention. There is a flow F in a pipe 10 and the velocity $V_k$ of said flow is measured. The object concerned is, for example, the paper pulp stock flow in the system of distribution pipes, called the pipe assembly, of a paper machine. The pipe 10 is then one of the distribution pipes, which pipes distribute the stock suspension flow from the distribution header of the headbox into the equalizing chamber or another equivalent component. It is important with a view to obtaining a uniform flow profile, to know the flow velocities $V_k$ in the different distribution pipes 10 in order to achieve a good web formation.

Figure 2:
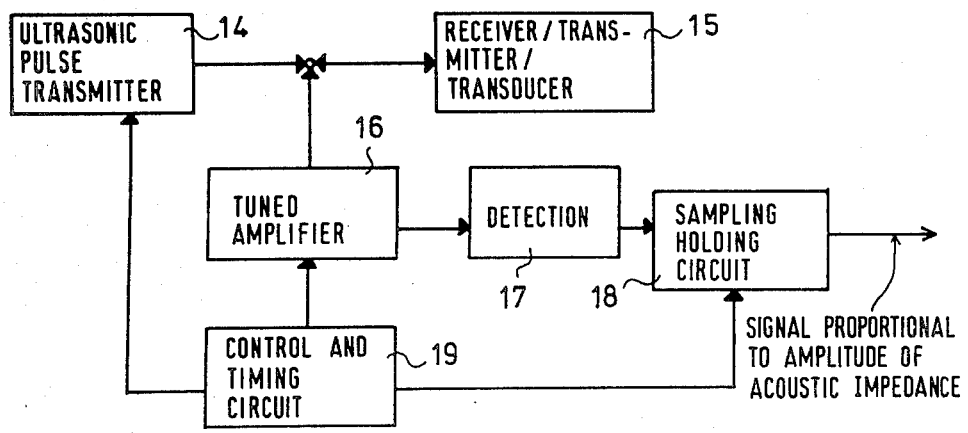
FIG. 2 is a block diagram of an embodiment of the ultrasonic echo pulse transmitter/receiver of FIG. 1.

As shown in FIG. 1, ultrasonic transducers 11A and 11B are mounted on the sides of the pipe 10. There is a distance L between the transducers 11A and 11B in the direction flow F. The ultrasonic transducers 11A and 11B operate as both transmitters and receivers in a manner which will become apparent hereinafter. The transducers 11A and 11B are electrically connected to an ultrasonic echo pulse transmitter/receiver 12, of which the block diagram is shown in FIG. 2. The aforementioned signals x(t) and y(t) are derived from the transmitter/receiver 12 and are correlated by a commercially available correlator 13 of any suitable known type.

The principle of flow measurement is more closely described hereinafter with reference to FIGS. 1 and 2. As hereinbefore mentioned, the ultrasonic transducers 11A and 11B serve as both transmitters and receivers. In the measurement procedure, an echo pulse at right angles to the flow F is transmitted from the two transducers 11A and 11B, spaced from each other by the distance L. The echo pulse reflected from the wall 10' of the pipe 10 opposite the transducers 11A and 11B is received after a predetermined time, by which the measuring depth is controlled. If the pipe 10 is metal, nothing but the echo from the opposite wall 10' is received back by the transmitter transducer.

When the pipe 10 has a small diameter such as, for example, a pipe in the system of distribution pipes of the headbox having a diameter of 33.7 mm, the first echo from the opposite wall 10' is masked by the transmitted pulse, the transducers 11A and 11B and the pipe 10 still "sounding". The principle of the invention is, in fact, to use the second echo from the opposite wall 10' of the pipe 10, or several such echos, whereby the ultrasonic pulse will traverse the distance of the pipe diameter four or more times, and thus to take the average over the flow profile. The cellulose fibres cause an amplitude modulation in the echos which is detected in accordance with the invention. The low frequency signals x(t) and y(t) thus obtained are compared by the correlator 13 and the flow velocity $V_k$ is determined by the aforedescribed correlation method.

It is not always to advantage, nor even always possible, in applications of the method and apparatus of the invention to use the second, or a later, echo from the opposite wall 10' of the pipe 10 conducting the suspension flow to be measured. In such instances, particularly in measuring pipes 10 of large diameter, the invention may be advantageously carried out in a manner whereby the echos which are received, and on the basis of which the low frequency useful signal is obtained, are the first echos scattered from the fibres or other equivalent particles in the suspension. In such case, the measuring signal does not traverse the measuring pipe; it is, instead, scattered at a suitable depth from the fibres or particles in the suspension. The measuring depth may be controlled in the aforedescribed manner.

The correlation measuring method of the invention is, in a way, an application of "tracer" substance measurement. As taught by the invention, the "tracer" consists of the natural variation occurring in the flow and which is particularly peculiar to a suspension flow such as, for example, the flow of paper pulp stock. It is also important that there is no need for the action of the measuring transducers to interfere in any way with the flow. It is thus understood that the low frequency signals based on amplitude modulation, produced in the aforedescribed manner in the ultrasonic echos by the cellulose fibres or equivalent, serve as marker signals by which the passage of a given local spot past the transducer is identified. The flow velocity may thereby be measured by the two transducers 11A and 11B placed the known distance L from each other.

Two identical ultrasonic probes are used to generate the signals to be correlated, which are needed in order to determine the flow velocity of the mass flowing in the pipe 10. One of the ultrasonic probes is shown in a block diagram in FIG. 2 and in a circuit diagram in FIG. 3.

In the ultrasonic probe of FIG. 2, a transmitter 14 is composed of a thyristor, an RC charging circuit and a matching resistor. With the aid of the thyristor, the energy stored in the capacitor is triggered through the matching resistor to a receiver/transmitter transducer crystal 15. A pulse is thereby obtained, which, however, in practice is a pulse of finite length, containing an exceedingly broad frequency spectrum. The transducer crystal 15 acts as a narrow band filter, beginning to oscillate at its characteristic frequency and emitting an ultrasonic pulse. The gain of a tuned amplifier 16 is reduced to minimum for the moment of pulse transmission. AM detection by a detection circuit 17 is accomplished simply by half-wave rectification of the echo signal from the amplifier 16. The detector or detection circuit 17 comprises an RC circuit so dimensioned that the enveloping curve of the echo signal is obtained as a result.

A sampling and holding circuit 18 is utilized to fix the sampling depth. The circuit 18 consists of a driven channel transistor and a capacitor. The channel transistor is controlled to be open and closed, respectively, by a pulse derived from a control and timing circuit 19, which controls the tuned amplifier 16, so that its gain is at its minimum during the transmission and after-oscillation of the ultrasonic pulse.

Figure 3:
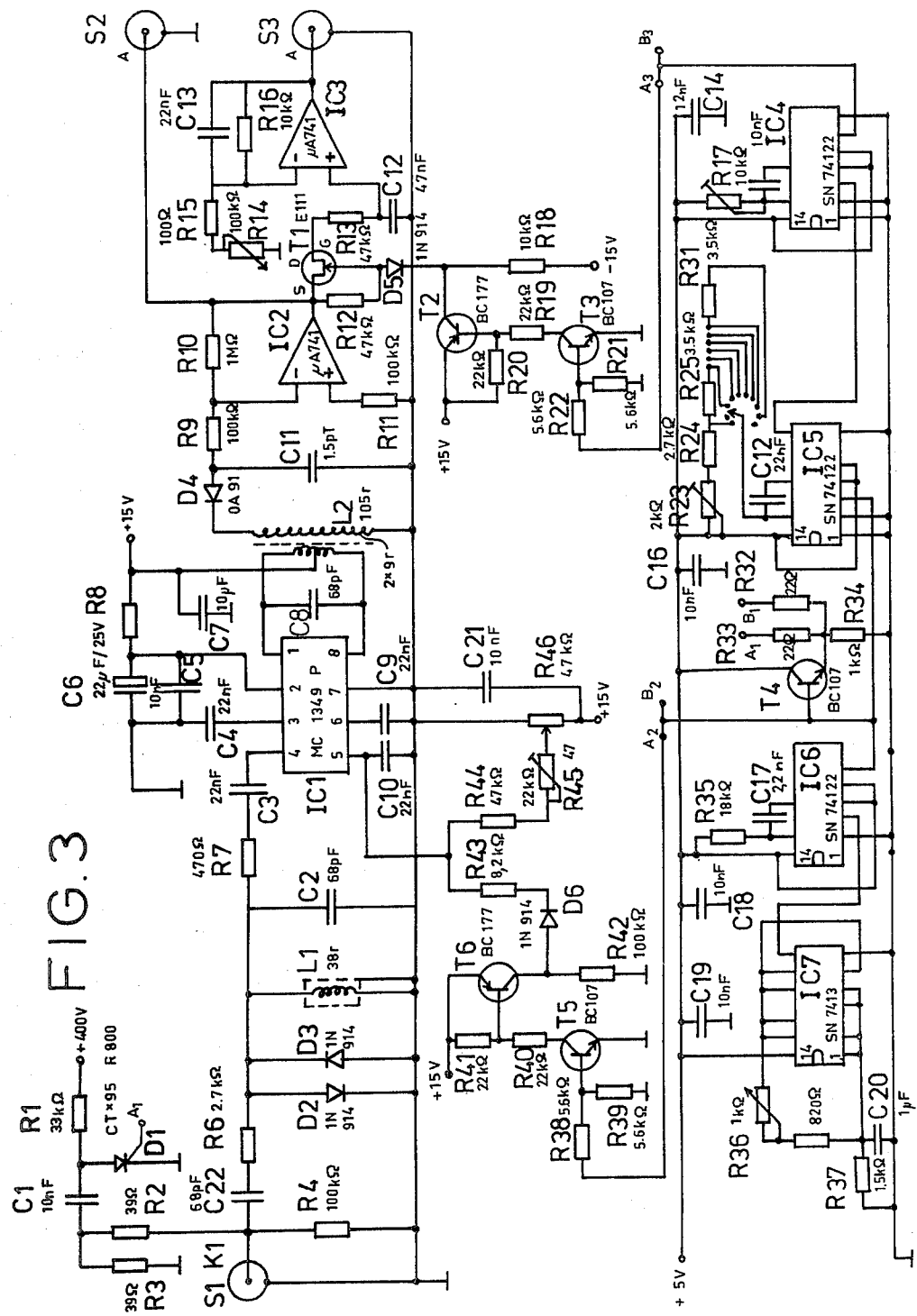
FIG. 3 is the circuit diagram of one channel of the ultrasonic echo pulse transmitter/receiver of FIG. 1, identical to the other channel of the circuit.

In the circuit diagram of FIG. 3, the function of resistors R1 . . . R3, capacitor C1 and thyristor D1 is charging of the ultrasonic pulse with the aid of said capacitor and its matching to the transducer crystal. The ultrasonic pulse of 2 MHz is transmitted from K1 to the crystal 1 and the echo pulse reflected from the opposite wall 10' of the pipe 10 returns to the point K1. Resistor R4, capacitor C22, resistor R6, diodes D2 and D3, inductor L1 and capacitor C2 are tuned to be a 2 MHz bandpass filter. The bandwidth is 400 kHz. The purpose of integrated circuit IC1, resistors R7 and R8 and capacitors C3, C4, C5, C6, C7, C9 and C10 is amplification of the signal. At the moment of ultrasonic pulse emission, the gain is at its minimum. The amplifier IC1 is controlled with the aid of integrated circuits IC6 and IC7, capacitors C17 . . . C21, resistors R35 . . . R46, transistors T5 and T6 and diode D2, so that it is a minimum at the moment when the ultrasonic pulse is emitted and a maximum when the echo pulse is received.

The useful signal is detected with the aid of capacitors C8 and C11, diode D4, inductor L2, resistors R9 . . . R11 and integrated circuit IC2. It is thus understood that amplitude detection and modulation amplification are concerned. The echo pulse may be displayed from S2. The purpose of resistors R12 . . . R16, capacitors C12 and C13 and transistor T1 is to take samples of the useful signal. Thus, this part operates as the sampling and holding circuit. The low frequency signal is provided to the correlator 13 from S3. Integrated circuit IC4, resistors R17 . . . R22, capacitor C14, transistors T2 and T3, diode D5, integrated circuit IC5, resistors R23 . . . R31 and capacitors C15 and C16 determine the sampling depth. The sampling depth may be varied by means of resistors R23 . . . R31. Similarly, the sampling frequency may be changed by resistor R17, transistor T4 and resistors R32 . . . R34 to control the thyristor triggering.

The most important application of the invention thus far is the interest which the papermaking industry has in uniform distribution of the paper pulp stock on the wire. The echo pulse is used for measuring, for example, instead of the continuous wave correlation technique in the method and apparatus of the invention. Since the first opposite wall echo is drowned by the transmission pulse and after-oscillation, the second, or a later, echo from the opposite wall 10' of the pipe 10, or equivalent, is expressly used in the apparatus and procedure of the invention.

The pipe in the pipe assembly of the headbox of a paper machine imposes special requirements on the apparatus of the invention. More particularly, the apparatus of the invention must function in a highly turbulent and cavitation-like situation which prevails in the pipe of the pipe assembly. Since there is a throttling sleeve at the beginning of the pipe 10, the flow forms a jet, and, since the pipe is short, being about 40 cm, the flow does not have time to settle to be normal. Preliminary practical measurements have borne out how necessary the measurement of flow velocity is in controlling and adjusting the distribution of stock on the wire. As a rule, in paper machines only 15% of the stock is conducted onto the wire, while 85% bypass said wire. Such bypass is utilized in an attempt to regulate the stock to become uniformly distributed on the wire. Completed preliminary studies have proven that the best paper quality is achieved with about 30% bypass. The flow in the pipes of the pipe assembly was then very uniform.

Determination of the flow profile across the paper web likewise demonstrates the need to use the method and apparatus of the invention, at the stage when the shape of the headbox of the paper machine is being designed. It is also clear that there are energy savings when it is no longer necessary to bypass 85% of the stock. This bypass flow may, by exact dimensioning, be reduced to 30%. It will be possible in the future, with a view to turning out the best paper, to automate the headbox of the paper machine, also. The ultrasonic echo pulse correlation meter is practical in the implementation of this idea, since it is small in size, easy to install and does not interfere with the flow.

As hereinbefore stated, in order to achieve the best result in measurements on the pipe assembly of the headbox, or to obtain the best coefficient of correlation, the second opposite wall echo must be used. In such case, the ultrasonic pulse is transmitted from the transducer perpendicularly to the opposite wall of the pipe, is reflected at said wall back to the wall of the transducer, where another reflection back to the opposite wall occurs, and is reflected once again from the opposite wall to the transmitter transducer. Since the speed of ultrasound in the fluid under measurement is known, it is possible, by adjustable timing, to specifically receive only the echo which has traversed the pipe diameter four times.

Ultrasonic pulses are emitted at a repetition frequency of 600 Hz to 1 kHz. Fibres, or whatever particles, in the fluid give rise in the 2 MHz ultrasonic pulse, equal to the resonance frequency of the ultrasonic crystal utilized, to a low frequency amplitude modulation, which is detected. Low frequencies are obtained from larger fibre conglomerations and high frequencies from smaller ones. The frequencies increase as the flow velocity is increased. However, the highest primary signal frequencies do not correlate with each other, and it is therefore more difficult to study the smaller fibres. The lack of correlation in the case of high frequencies is believed to be due to the fact that when the distance between the transducers is increased, the minuscule similarity disappears first from the primary signals. The actual useful signal proper has a frequency between 20 and 200 Hz.

A particular overlay plate may be utilized to affix the transducers 11A and 11B to the pipe 10. Holes are drilled in the pipe 10 in alignment with the plates. These holes are plugged with plastic, or equivalent, to obtain a smooth interior surface of the pipe. This prevents the transducers from disturbing the flow. Measuring windows of plastic, or equivalent, facilitate the transmitting of ultrasonic pulses and their reception, compared with the transmission and reception of the ultrasonic pulses through the metal wall of the pipe 10. It is possible to use various membrane structures as measuring windows, instead of plastic-plugged holes. Such membranes must naturally withstand the pressure prevailing in the measuring pipe 10.

The measuring principle of the invention is applicable, for example, in measuring the flow of sand/water, ash/water, effluent, paper pulp stock, cellulose pulp and, in general, such binary or multi-fraction fluids in which one component is more coarsely distributed and will produce AM-detectable echos, while the other component may be any liquid whatsoever.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of ultrasonically measuring the flow velocity of a suspension flowing through a pipe, said pipe having a surface, said method comprising the steps of
    transmitting and receiving ultrasonic echo pulses from said surface of said pipe from points spaced from each other a predetermined distance in the direction of flow through said pipe into said suspension flow, said ultrasonic pulses passing through said suspension and being received after a time determined by the measuring depth, the received pulses including a low frequency signal caused by fibres and other particles in said suspension;
    detecting the amplitudes of said low frequency signals and producing signals in accordance with said amplitudes; and
    correlating said signals to determine the flow velocity of said suspension.

2. A method as claimed in claim 1, wherein said pipe has an inner wall opposite said surface and further comprising transmitting said ultrasonic pulses from said transducers substantially perpendicularly to said inner opposite wall, said ultrasonic pulses being reflected back to said surface from which it is reflected back to said inner opposite wall, then reflected once again to said transducers thereby providing a second echo from said inner opposite wall.

3. A method as claimed in claim 1, wherein said ultrasonic echo pulses are transmitted into said pipe and said measuring depth is utilized especially when said pipe has a large diameter and is such that an echo of said ultrasonic pulses received after a time determined by said depth is such that said echo consists of first echos scattered from fibres and other particles in the suspension.

4. A method as claimed in claim 1, wherein said ultrasonic pulses are transmitted at a repetition frequency ranging from 200 Hz to 50 kHz.

5. A method as claimed in claim 1, wherein said ultrasonic pulses are transmitted at a repetition frequency in the range of 600 Hz to 1 kHz.

6. A method as claimed in claim 1, wherein said ultrasonic pulses are produced at a frequency of 0.5 to 6 mHz.

7. A method as claimed in claim 1, wherein said ultrasonic pulses are produced at a frequency of approximately 2 mHz.

8. A method as claimed in claim 1, wherein said low frequency signals are produced in a frequency range from 20 to 200 Hz.

9. Apparatus for measuring the flow velocity of a suspension flowing through a pipe having an inner surface by ultrasonic echo pulses, said apparatus comprising
    at least two ultrasonic transducers located a predetermined distance from each other and mounted on the surface of said pipe for transmitting ultrasonic pulses through said suspension and receiving and pulses;
    an ultrasonic echo pulse transmitter/receiver separately electrically connected to each of said transducers and producing different electrical signals corresponding to said transducers; and correlation means electrically connected to said ultrasonic echo pulse transmitter/receiver for correlating said signals to determine the flow velocity of said suspension.

10. Apparatus as claimed in claim 9, wherein said suspension comprises a paper pulp suspension.

11. Apparatus as claimed in claim 9, wherein said suspension comprises a pulp stock suspension in the headbox of a paper machine.

12. Apparatus as claimed in claim 9, wherein said pipe consists of one of a plurality of small diameter distribution pipes from the distribution header of the headbox of a paper machine and said suspension comprises a paper pulp suspension.

13. Apparatus as claimed in claim 9, wherein said pipe has a plurality of windows therein, said windows being covered with liquid impervious material and sealed in a liquid-tight manner, and said transducers being mounted at said windows.

14. Apparatus for measuring, controlling and equalizing the cross-machine stock suspension flow profile of the headbox of a paper machine having a plurality of distribution pipes of small diameter extending from the distribution header of said machine, said apparatus comprising
    at least two ultrasonic transducers located at a predetermined distance from each other and mounted on the surface of at least one of said pipes for transmitting ultrasonic pulses through said suspension and receiving said pulses;
    an ultrasonic echo pulse transmitter/receiver separately electrically connected to each of said transducers and producing different electrical signals corresponding to said transducers; and
    correlation means electrically connected to said ultrasonic echo pulse transmitter/receiver for correlating said signals to determine the flow velocity of said suspension.

15. Apparatus as claimed in claim 9, wherein said ultrasonic echo pulse transmitter/receiver comprises an ultrasonic pulse transmitter, a transmitter/receiver transducer electrically connected to said transmitter, a tuned amplifier electrically connected to said transmitter and said transducer, a detector electrically connected to said amplifier, a sampling and holding circuit electrically connected to said detector and a control and timing circuit electrically connected to said sampling and holding circuit and said transmitter.

16. Apparatus as claimed in claim 14, wherein said ultrasonic echo pulse transmitter/receiver comprises an ultrasonic pulse transmitter, a transmitter/receiver transducer electrically connected to said transmitter, a tuned amplifier electrically connected to said transmitter and said transducer, a detector electrically connected to said amplifier, a sampling and holding circuit electrically connected to said detector and a control and timing circuit electrically connected to said sampling and holding circuit and said transmitter.

* * * * *